(12) United States Patent
Luo et al.

(10) Patent No.: US 11,463,124 B2
(45) Date of Patent: Oct. 4, 2022

(54) FULL-TIME DUPLEX SYSTEM, FULL-TIME DUPLEX CIRCUIT, AND CONTROL METHOD

(71) Applicant: ZTE CORPORATION, Guangdong (CN)

(72) Inventors: Yibao Luo, Guangdong (CN); Lin Li, Guangdong (CN); Jing Gao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 275 days.

(21) Appl. No.: 16/769,751

(22) PCT Filed: Oct. 9, 2018

(86) PCT No.: PCT/CN2018/109489
§ 371 (c)(1),
(2) Date: Jun. 4, 2020

(87) PCT Pub. No.: WO2019/109723
PCT Pub. Date: Jun. 13, 2019

(65) Prior Publication Data
US 2020/0389203 A1    Dec. 10, 2020

(30) Foreign Application Priority Data

Dec. 4, 2017 (CN) .......................... 201711260905.2

(51) Int. Cl.
*H04B 1/525* (2015.01)
*H04B 17/318* (2015.01)
*H04L 5/14* (2006.01)

(52) U.S. Cl.
CPC ........... *H04B 1/525* (2013.01); *H04B 17/318* (2015.01); *H04L 5/1461* (2013.01)

(58) Field of Classification Search
CPC ........ H04B 1/525; H04B 17/318; H04B 1/40; H04L 5/1461; H04L 5/1453
See application file for complete search history.

(56) References Cited

U.S. PATENT DOCUMENTS 4,406,016 A * 9/1983 Abrams ............. H04B 7/15585
455/24
5,691,978 A * 11/1997 Kenworthy ............ H04B 7/002
370/278

(Continued)

FOREIGN PATENT DOCUMENTS

CN    101222694    7/2008
CN    102571655    7/2012

(Continued)

OTHER PUBLICATIONS

B. Yang, Y. Dong, Z. Yu and J. Zhou, "An RF self-interference cancellation circuit for the full-duplex wireless communications," 2013 Proceedings of the International Symposium on Antennas & Propagation, 2013, pp. 1048-1051. (Year: 2013).*

(Continued)

*Primary Examiner* — Ayaz R Sheikh
*Assistant Examiner* — Tarell A Hampton
(74) *Attorney, Agent, or Firm* — Vivacqua Crane, PLLC

(57) ABSTRACT

Provided is a full-time duplex system. The system includes: a receiving antenna (107), a transmitting antenna (108), a transmitting channel (109), an LNA (106), a mode determination unit (101), a power detection amplitude phase adjustment unit (102), an RSSI detection amplitude phase adjustment unit (103) and an amplitude phase unit (104); the power detection amplitude phase adjustment unit (102) is electrically connected between the receiving antenna (107) and the low noise amplifier (106) and also between the transmitting antenna (108) and the transmitting channel (109); the mode determination unit (101) notifies, according (Continued)

to a power range which a signal transmitting power of the full-time duplex system belongs to, one of the power detection amplitude phase adjustment unit (102) or the RSSI detection amplitude phase adjustment unit (103) of controlling the amplitude phase unit (104) to adjust an amplitude and a phase of a transmitting cancellation signal.

20 Claims, 4 Drawing Sheets

(56) References Cited

U.S. PATENT DOCUMENTS

| | | | | |
|---|---|---|---|---|
| 6,229,992 B1* | 5/2001 | McGeehan | ............ | H04B 1/408 455/24 |
| 6,539,204 B1* | 3/2003 | Marsh | .................. | H04B 1/123 455/296 |
| 6,915,112 B1* | 7/2005 | Sutton | .................. | H04B 1/126 455/305 |
| 7,095,985 B1* | 8/2006 | Hofmann | ............... | H04B 1/525 455/75 |
| 2013/0102254 A1* | 4/2013 | Cyzs | ........................ | H04B 1/10 455/63.1 |
| 2014/0072072 A1* | 3/2014 | Ismail | ................... | H04B 15/00 375/269 |
| 2014/0169236 A1* | 6/2014 | Choi | ..................... | H04L 5/1461 370/278 |
| 2014/0204808 A1* | 7/2014 | Choi | ..................... | H04L 5/1461 370/278 |
| 2015/0215937 A1* | 7/2015 | Khandani | .............. | H04B 1/525 370/277 |
| 2016/0119019 A1* | 4/2016 | Pratt | ....................... | H04W 4/70 370/278 |
| 2016/0156453 A1 | 6/2016 | Chien et al. | | |
| 2016/0380706 A1* | 12/2016 | Tanzi | ....................... | H04B 1/48 455/78 |
| 2017/0033905 A1 | 2/2017 | Huang | | |
| 2019/0165822 A1* | 5/2019 | Chen | ...................... | H04B 1/525 |
| 2022/0026520 A1* | 1/2022 | Han | ......................... | G01S 7/038 |

FOREIGN PATENT DOCUMENTS

| | | |
|---|---|---|
| CN | 103427874 | 12/2013 |
| CN | 103580720 | 2/2014 |
| CN | 103973349 | 8/2014 |
| CN | 104617981 | 5/2015 |
| CN | 106330241 | 1/2017 |
| CN | 108023608 | 5/2018 |

OTHER PUBLICATIONS

Jain, M., Choi, J. I., Kim, T., Bharadia, D., Seth, S., Srinivasan, K., . . . & Sinha, P. (Sep. 2011). Practical, real-time, full duplex wireless. In Proceedings of the 17th annual international conference on Mobile computing and networking (pp. 301-312). ACM. (Year: 2011).*

CCFD Interference Cancellation for 5G Terminal. Zang Changqing. 2017.

State Intellectual Property Office of People's Republic of China, Notification of First Office Action for Application No. 201711260905.2, dated Apr. 28, 2019, China.

State Intellectual Property Office of People's Republic of China, Notification of Second Office Action for Application No. 201711260905.2, dated Sep. 20, 2019, China.

Patent Cooperation Treaty (PCT), International Search Report and Written Opinion for Application PCT/CN2018/109489 filed Oct. 9, 2018 dated Jan. 4, 2019, International Searching Authority, CN.

\* cited by examiner

FULL-TIME DUPLEX SYSTEM, FULL-TIME DUPLEX CIRCUIT, AND CONTROL METHOD

CROSS-REFERENCE TO RELATED APPLICATION

This is a National Stage Application, filed under 35 U.S.C. 371, of International Patent Application No. PCT/CN2018/109489, filed on Oct. 9, 2018, which claims priority to Chinese patent application No. 201711260905.2 filed on Dec. 4, 2017, contents of both of which are incorporated herein by reference in their entireties.

TECHNICAL FIELD

The present application relates to, but is not limited to, the field of communications, in particular, to a full-time duplex system, full-time duplex circuit and control method.

BACKGROUND

Full-time duplex is also called co-frequency co-time full duplex (CCFD). CCFD wireless communication equipments use same time and same frequency to simultaneously transmit and receive radio signals, so that spectral efficiency of wireless communication links is doubled. The CCFD is an important feature of fifth generation mobile communication (5G) technologies. Since receiving and transmitting are co-frequency and co-time, a transmitting signal of a CCFD transmitter interferes with a local receiver. Therefore, a primary task of using the CCFD is to suppress strong self-interference. Self-interference cancellation capability will directly affect the communication quality of a CCFD system.

SUMMARY

The following is a summary of the subject matter described herein in detail. This summary is not intended to limit the scope of the claims.

The present disclosure provides a full-time duplex (CCFD) system, a full-time duplex circuit and a control method to effectively cancel self-interferences of the CCFD system and ensure a normal operation of a low noise amplifier (LNA).

In an embodiment, the present disclosure provides a full-time duplex system, the system includes a receiving antenna, a transmitting antenna, a transmitting channel, a low noise amplifier (LNA), a mode determination unit, a power detection amplitude phase adjustment unit, a received signal strength indication (RSSI) detection amplitude phase adjustment unit and an amplitude phase unit;

where, the power detection amplitude phase adjustment unit is electrically connected between the receiving antenna and the low noise amplifier, and the power detection amplitude phase adjustment unit is electrically connected between the transmitting antenna and the transmitting channel; the mode determination unit is electrically connected to the power detection amplitude phase adjustment unit and the received signal strength indication detection amplitude phase adjustment unit, the power detection amplitude phase adjustment unit and the received signal strength indication detection amplitude phase adjustment unit are electrically connected to the amplitude phase unit respectively;

the mode determination unit notifies, according to a power range which a signal transmitting power of a full-time duplex system belongs to, one of the power detection amplitude phase adjustment unit or the received signal strength indication detection amplitude phase adjustment unit of controlling the amplitude phase unit to adjust an amplitude and a phase of a transmitting cancellation signal.

In an embodiment, the present disclosure provides a full-time duplex circuit. The full-time duplex circuit includes a first coupler, a second coupler, and a first combiner; where the first coupler and the second coupler are electrically connected to the first combiner respectively; the first coupler is electrically connected between the receiving antenna and the low noise amplifier, and the first coupler transmits a transmitting signal leaked to the receiving channel to the first combiner, the second coupler is electrically connected between the transmitting antenna and the transmitting channel, and the second coupler transmits the transmitting cancellation signal branched from the transmitting channel to the first combiner; an output power of the first combiner after the first combiner performs a combination processing on the transmitting signal and the transmitting cancellation signal is served as a basis for adjusting the amplitude and the phase of the transmitting cancellation signal.

In an embodiment the present disclosure provides a terminal used for a full-time duplex system, the terminal includes a full-time duplex circuit, a receiving antenna, a receiving channel, a low noise amplifier, a transmitting antenna, and a transmitting channel; the receiving channel is electrically connected between the receiving antenna and the low noise amplifier;

where the full-time duplex circuit includes: a first coupler, a second coupler, and a first combiner; the first coupler and the second coupler are electrically connected to the first combiner respectively, the first coupler is electrically connected between a receiving antenna and a low noise amplifier, and the first coupler transmits a transmitting signal leaked to the receiving channel to the first combiner; the second coupler is electrically connected between the transmitting antenna and the transmitting channel, and the second coupler transmits the transmitting cancellation signal branched from the transmitting channel to the first combiner; an output power of the first combiner after the first combiner performs a combination processing on the transmitting signal and the transmitting cancellation signal is served as a basis for adjusting an amplitude and a phase of the transmitting cancellation signal.

In an embodiment the present disclosure provides a control method for a full-time duplex system, the full-time duplex system comprises: a receiving antenna, a transmitting antenna, a transmitting channel, a low noise amplifier, and a power detection amplitude phase adjustment unit. The power detection amplitude phase adjustment unit is electrically connected between the receiving antenna and the low noise amplifier, and the power detection amplitude phase adjustment unit is electrically connected between the transmitting antenna and the transmitting channel.

The method includes steps described below. A signal transmitting power of the full-time duplex system is acquired; according to a power range which the signal transmitting power of the full-time duplex system belongs to, an amplitude and a phase of a transmitting cancellation signal are adjusted based on one of an output power of the power detection amplitude phase adjustment unit or a received signal strength indication.

In an embodiment the present disclosure provides a communication device, the communication device includes: a receiving antenna, a transmitting antenna, a transmitting channel, a low noise amplifier, a power detection amplitude phase adjustment unit, a processor and a memory; where the power detection amplitude phase adjustment unit is electrically connected between the receiving antenna and the low noise amplifier, and the power detection amplitude phase adjustment unit is electrically connected between the transmitting antenna and the transmitting channel; and the memory is configured to store a control program for a full-time duplex system. When executed by the processor, the control program performs the control method provided by the fourth aspect.

In addition, the present disclosure further provides a computer-readable medium, which is configured to store a control program for a full-time duplex system. When executed by the processor, the control program performs the control method provided by the fourth aspect.

In the present disclosure, the CCFD system includes: the receiving antenna, the transmitting antenna, the transmitting channel, the LNA, the mode determination unit, the power detection amplitude phase adjustment unit, the RSSI detection amplitude phase adjustment unit and the amplitude phase unit; where the power detection amplitude phase adjustment unit is electrically connected between the receiving antenna and the LNA, and is electrically connected between the transmitting antenna and the transmitting channel. The mode determination unit is electrically connected to the power detection amplitude phase adjustment unit and the RSSI detection amplitude phase adjustment unit, the power detection amplitude phase adjustment unit and the RSSI detection amplitude phase adjustment unit are electrically connected to the amplitude phase unit respectively. The mode determination unit notifies, according to the power range which the signal transmitting power of the full-time duplex system belongs to, one of the power detection amplitude phase adjustment unit or the RSSI detection amplitude phase adjustment unit of controlling the amplitude phase unit to adjust the amplitude and the phase of the transmitting cancellation signal. The embodiments of the present disclosure adopt a segmented processing manner for adjusting the amplitude and the phase to effectively cancel the self-interferences of the CCFD system and avoid an LNA distortion caused by a variable inherent phase and a small isolation of the transmitting antenna and the receiving antenna of the CCFD system, thereby ensuring the normal operation of the LNA.

Other aspects can be understood after the drawings and the detailed description are read and understood.

DETAILED DESCRIPTION

Figure 1:
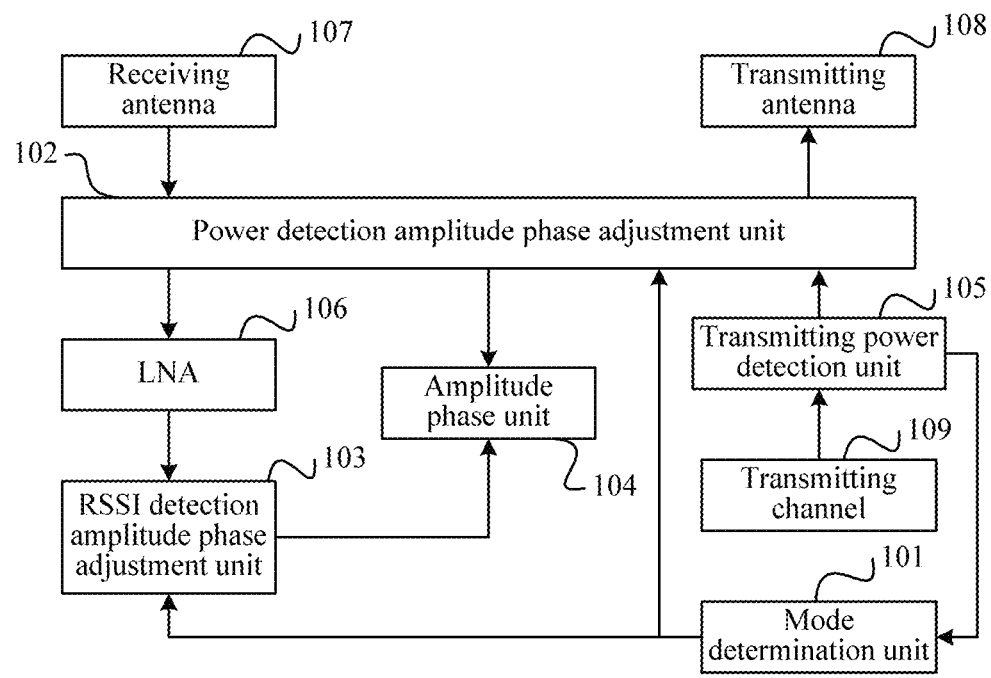
FIG. 1 is a schematic diagram of a CCFD system provided by an embodiment of the present disclosure.

The embodiments of the present disclosure will be described in detail in conjunction with the drawings, and it should be understood that the embodiments described hereinafter are intended to describe and explain the present disclosure and not to limit the present disclosure.

The steps illustrated in the flowcharts among the drawings may be performed by a computer system such as a group of computer-executable instructions. Moreover, although logical sequences are illustrated in the flowcharts, the illustrated or described steps may be performed in sequences different from those described herein in some cases.

In a self-interference cancellation research of a CCFD system under a point-to-point scenario, according to different interference cancellation methods and positions, there are three self-interference cancellation technologies as follows: an antenna interference cancellation, a radio frequency interference cancellation and a digital interference cancellation. The antenna interference cancellation mainly uses antenna positions, in which a distance between a transmitting antenna and a receiving antenna is set as half of a signal wavelength, so that a phase difference of two transmitting signals received by the receiving channel is 180°, thereby cancelling mutual interferences with each other. The radio frequency interference cancellation uses a receiving signal combined with a signal branched from a transmitting signal to perform the amplitude phase adjustment, so that a phase of the combined transmitting signal is opposite to a phase of the transmitting signal received by the receiving antenna, which cancels the transmitting signal in the receiving channel. The digital interference cancellation is mainly used in that a signal leaked from the transmitting channel to the receiving channel is not large, an RSSI may be analyzed, through a digital signal processing, transmitted noise is filtered out through the digital processing. But if the signal leaked from the transmitting channel to the receiving channel is too strong, the receiving signal is annihilated by the leaked transmitting signal or the LNA is distorted, it is difficult to achieve the effect only by the digital interference cancellation.

On a wireless base station side of a 5G system, after antennas of the base station are erected, a distance between a transmitting and a receiving antenna, an impedance matching of a transmitting circuit and a receiving circuit, and a relative position between phases of the transmitting channel and the receiving channel are unlikely to change in a wide range, the radio frequency phase cancellation may be used. However, for a CCFD system where the antenna is not fixedly deployed, such as a mobile terminal, a vehicle-mounted system, etc., the transmitting antenna and the receiving antenna of such CCFD system are susceptible to external interferences. For example, the mobile terminal is held by a hand, antennas of the vehicle-mounted system shake during a driving process, etc., the phases of the transmitting antenna and the receiving antenna fluctuate greatly in a short time, which causes an unstable operation of a cancellation transmitting system, and an instant high-power fluctuation in the receiving channel. Moreover, the LNA may be in a non-linear working state in this case, which causes a system processing the cancellation to be failed.

The embodiments of the present disclosure provide a CCFD system, a CCFD circuit, and a control method for the CCFD system to effectively cancel the self-interference of the CCFD system, and avoid the LNA distortion caused by a variable inherent phase and the small isolation of the transmitting antenna and the receiving antenna of the CCFD system.

FIG. 1 is a schematic diagram of a CCFD system provided by an embodiment of the present disclosure. As shown in FIG. 1, the CCFD system provided by this embodiment includes a receiving antenna 107, a transmitting antenna 108, a transmitting channel 109, an LNA 106, a mode determination unit 101, a power detection amplitude phase adjustment unit 102, and a received signal strength indication (RSSI) amplitude phase adjustment unit 103 and an amplitude phase unit 104. The power detection amplitude phase adjustment unit 102 is electrically connected between the receiving antenna 107 and the LNA 106, and the power detection amplitude phase adjustment unit 102 is electrically connected between the transmitting antenna 108 and the transmitting channel 109; the mode determination unit 101 is electrically connected to the power detection amplitude phase adjustment unit 102 and the RSSI amplitude phase adjustment unit 103 respectively, the power detection amplitude phase adjustment unit 102 and the RSSI detection amplitude phase adjustment unit 103 are electrically connected to the amplitude phase unit 104 respectively.

The mode determination unit 101 notifies, according to a power range which a signal transmitting power of the CCFD system belongs to, one of the power detection amplitude phase adjustment unit 102 or the received signal strength indication detection amplitude phase adjustment unit 103 of controlling the amplitude phase unit 104 to adjust an amplitude and a phase of a transmitting cancellation signal.

In an exemplary embodiment, when the mode determination unit 101 determines that the signal transmitting power of the CCFD system satisfies a first power range, the mode determination unit 101 notifies the power detection amplitude phase adjustment unit 102 of controlling the amplitude phase unit 104 to adjust the amplitude and the phase of the transmitting cancellation signal; and when the mode determination unit 101 determines that the signal transmitting power satisfies a second power range, the mode determination unit 101 notifies the RSSI detection amplitude phase adjustment unit 103 of controlling the amplitude phase unit 104 to adjust the amplitude and the phase of the transmitting cancellation signal.

Where, a minimum value of the first power range is greater than or equal to a maximum value of the second power range. In other words, when the signal transmitting power is relatively large, an output result of the fronted power detection amplitude phase adjustment unit 102 is used as a basis for adjusting the amplitude and the phase of the transmitting cancellation signal, and when the signal transmitting power is relatively small, the RSSI is used as a basis for adjusting the amplitude and the phase of the transmitting cancellation signal.

The CCFD system in this embodiment may be a base station or a mobile terminal. However, which is not limited in the present disclosure.

As shown in FIG. 1, the CCFD system of this embodiment may further include a transmitting power detection unit 105, the transmitting power detection unit 105 is electrically connected between the transmitting channel 109 and the transmitting antenna 108, and the transmitting power detection unit 105 is electrically connected to the mode determination unit 101. The transmitting power detection unit 105 detects the signal transmitting power of the CCFD system, and sends a detected signal transmitting power to the mode determination unit 101. For example, the transmitting power detection unit 105 may include a coupling circuit. After detecting the signal transmitting power, the coupling circuit may report the detected signal transmitting power to the mode determination unit 101.

Figure 2:
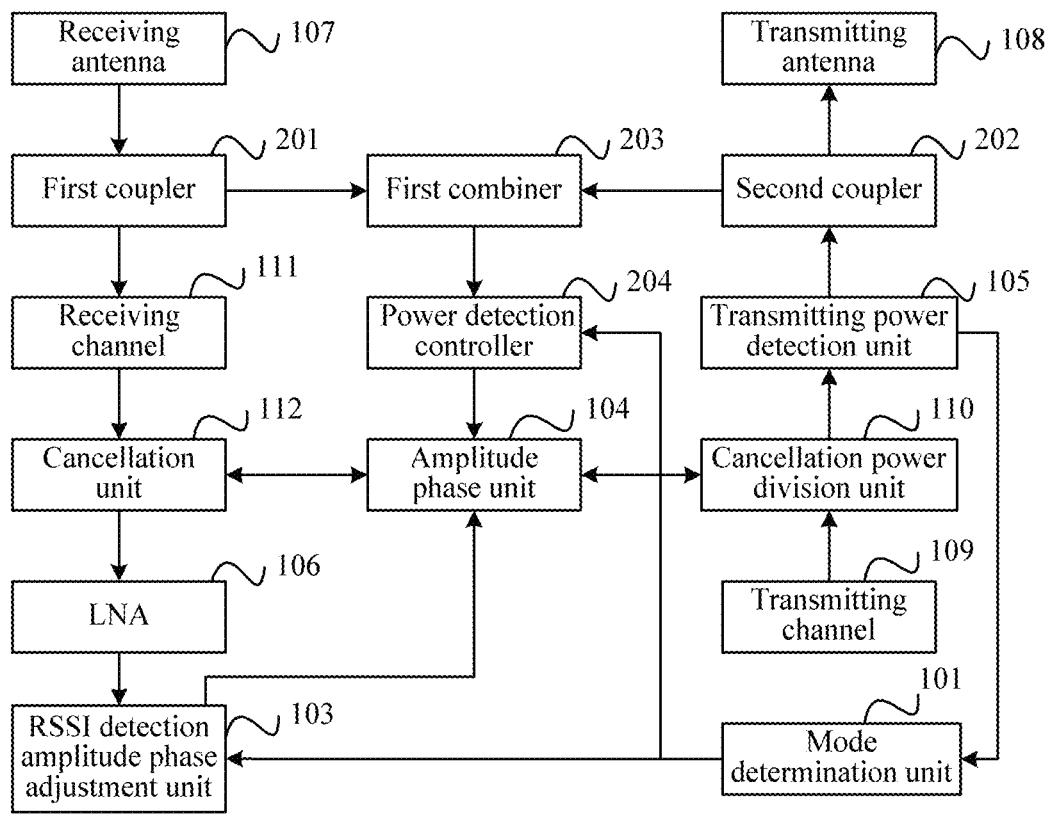
FIG. 2 is an exemplary diagram of a CCFD system provided by an embodiment of the present disclosure.

FIG. 2 is an exemplary diagram of a CCFD system provided by an embodiment of the present disclosure. As shown in FIG. 2, the CCFD system of this embodiment may further include a receiving channel 111, which is electrically connected between the receiving antenna 107 and the LNA 106.

As shown in FIGS. 1 and 2, the power detection amplitude phase adjustment unit 102 may include: a first coupler 201, a second coupler 202, and a first combiner 203; the first coupler 201 and the second coupler 202 are electrically connected to the first combiner 203 respectively; the first coupler 201 is electrically connected between the receiving antenna 107 and the receiving channel 111, and the first coupler 201 transmits a transmitting signal leaked to the receiving channel 111 to the first combiner 203. The second coupler 202 is electrically connected between the transmitting antenna 108 and the transmitting channel 109, and the second coupler 202 transmits the transmitting cancellation signal branched from the transmitting channel 109 to the first combiner 203. An output power of the first combiner 203 after the first combiner 203 performs a combination processing on the transmitting signal and the transmitting cancellation signal is served as a basis for adjusting the amplitude and the phase of the transmitting cancellation signal.

As shown in FIG. 2, the power detection amplitude phase adjustment unit 102 may further include a power detection controller 204, the power detection controller 204 is electrically connected to the mode determination unit 101, the first combiner 203 and the amplitude phase unit 104. After receiving a notification of the mode determination unit 101, the power detection controller 204 controls, according to the output power of the first combiner 203, the amplitude phase unit 104 to adjust the amplitude and the phase of the transmitting cancellation signal. In this example, the power detection controller 204 determines an amplitude phase adjustment mode of the transmitting cancellation signal based on the output power of the first combiner 203, and then controls the amplitude phase unit 104 to adjust the amplitude and the phase of the transmitting cancellation signal according to this adjustment mode. In this way, cancellation closed-loop control of the transmitting signal leaked to the receiving channel 111 is completed before the LNA 106.

In this embodiment, the transmitting power detection unit 105 detects the signal transmitting power and reports to a processor, and then the mode determination unit 101 implemented on the processor performs controlling of the amplitude phase adjustment based on the power range which the signal transmitting power belongs to; when the signal transmitting power satisfies a first power range, the power detection controller 204 is notified of controlling the amplitude phase unit 104 on the basis of the output power of the first combiner 203; when the signal transmitting power satisfies a second power range, the RSSI amplitude phase adjustment unit 103 is notified of controlling the amplitude phase unit 104 on the basis of the RSSI. The RSSI detection amplitude phase adjustment unit 103 determines how to adjust the amplitude and the phase of the transmitting cancellation signal on the basis of the RSSI after starting by receiving the notification of the mode determination unit 101, and controls the amplitude phase unit 104 to adjust the amplitude and the phase of the transmitting cancellation signal accordingly.

As shown in FIG. 2, the CCFD system provided in this embodiment may further include: a cancellation unit 112 and a cancellation power division unit 110. Where the cancellation unit 112 is electrically connected to the receiving channel 111, the LNA 106 and the amplitude phase unit 104, the cancellation power division unit 110 is electrically connected to the transmitting power detection unit 105, the transmitting channel 109 and the amplitude phase unit 104. The cancellation power division unit 110 is used for branching the transmitting cancellation signal from the transmitting channel 109; the cancellation unit 112 is used for performing the cancellation on a receiving signal of the receiving channel 111 and the transmitting cancellation signal branched from the transmitting channel 109.

In this embodiment, the minimum value of the first power range and the maximum value of the second power range may be determined according to an isolation of the transmitting antenna 108 and the receiving antenna 107 of the CCFD system and a maximum input power for receiving and using the LNA 106 (i.e., 1 db compression point power). For example, a sum of the 1 db compression point power for receiving and using the LNA 106 and the isolation of the receiving antenna 107 and the transmitting antenna 108 may be determined as a power range division reference value, and then the minimum value of the first power range and the maximum value of the second power range are determined according to the power range division reference value. Exemplarily, the minimum value of the first power range and the maximum value of the second power range may also be determined in conjunction with the power range division reference value and a system fault-tolerant power value, where the system fault-tolerant power value may include a buffer value that prevents the system from ping-pong handovers and a discrete value of batch devices. For example, if the power range division reference value is A and the system fault-tolerant power value is C, the minimum value of the first power range may be A+C and the maximum value of the second power range may be A, where C may be equal to a sum of the buffer value that prevents the system from ping-pong handovers and the discrete value of batch devices.

For example, a maximum input power of an LNA (i.e., the 1 db compression point power of the LNA) is 5 dBm, a maximum power transmitted by the CCFD system is 27 dBm, and the isolation of the transmitting antenna and the receiving antenna is 13 dBm, theoretically the transmitting power leaking to the receiving channel is 27−13=14 dBm, this power is the maximum power that the receiving channel may receive, a maximum power of the receiving channel does not exceed 14 dBm even if a cancellation phase is superimposed on a same direction. Theoretically, when the power of the receiving channel is less than 5 dBm, linear operations of the LNA may be ensured. When the transmitting power is 5+13=18 dBm, a transmitting distortion may occur, which may cause the LNA distortion when the transmitting power is in the range of 18 dBm to 27 dBm. It is inferred that 18 dBm may be served as the power range division reference value. In addition, according to the system fault-tolerant power value (which mainly includes the buffer value that prevents the system from ping-pong handovers and the discrete value of batch devices), the minimum value of the first power range and the maximum value of the second power range are determined, so as to provide a reference for selecting the basis of the amplitude phase adjustment of the transmitting cancellation signal.

In this embodiment, the segmented processing manner is used to adjust the amplitude and the phase, when the signal transmitting power of the CCFD system is relatively strong, relative fluctuations have a greater impact on the RSSI, and in this case the receiving signal is generally weak compared with the transmitting signal, the receiving signal is submerged in a noise power which is not cancelled by the transmitting cancellation, and the RSSI determination basis is lost. At this time, through a detection point configured before the LNA (i.e., the power detection amplitude phase adjustment unit) for determining the phase, the amplitude and the phase of the transmitting cancellation signal are adjusted before the LNA is distorted, so that the transmitting signal leaked to the receiving channel is cancelled before entering the LNA. When the signal transmitting power is relatively small and the receiving signal is relatively strong, the RSSI may be used as basis for more accurately controlling the amplitude phase unit to adjust the amplitude and the phase of the transmitting cancellation signal.

The following respectively describes the manner of adjusting the amplitude and the phase of the transmitting cancellation signal based on the RSSI, and the manner of adjusting the amplitude and the phase of the transmitting cancellation signal based on the output power of the first combiner of the power detection amplitude phase adjustment unit.

The manner of adjusting the amplitude and the phase of the transmitting cancellation signal based on the RSSI is described below.

Figure 3:
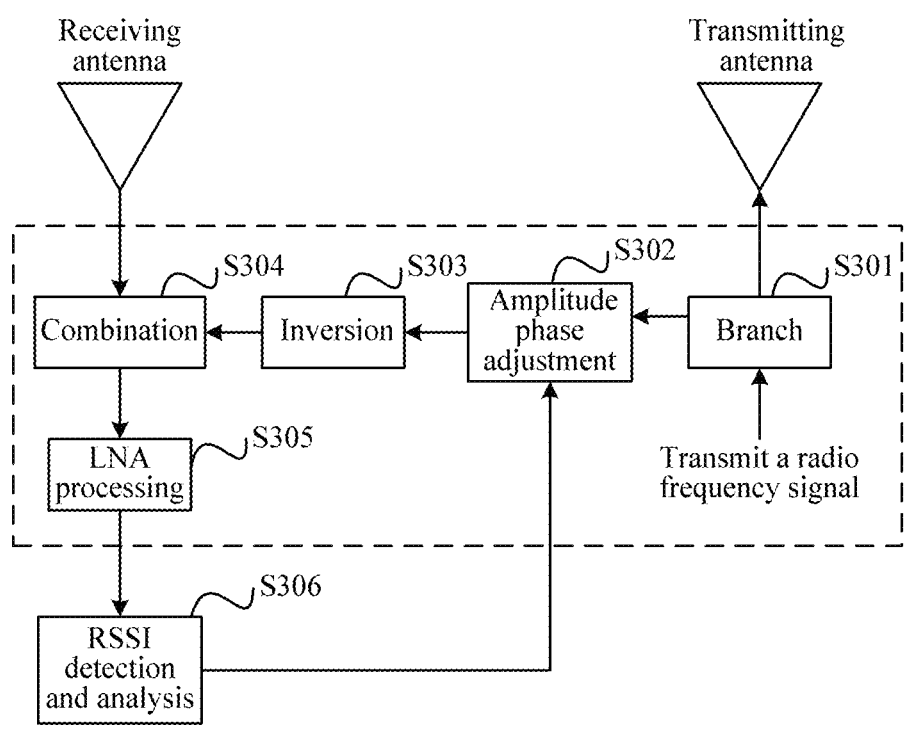
FIG. 3 is a schematic diagram illustrating principles of an amplitude phase adjustment on a basis of an RSSI in an embodiment of the present disclosure.
Figure 4:
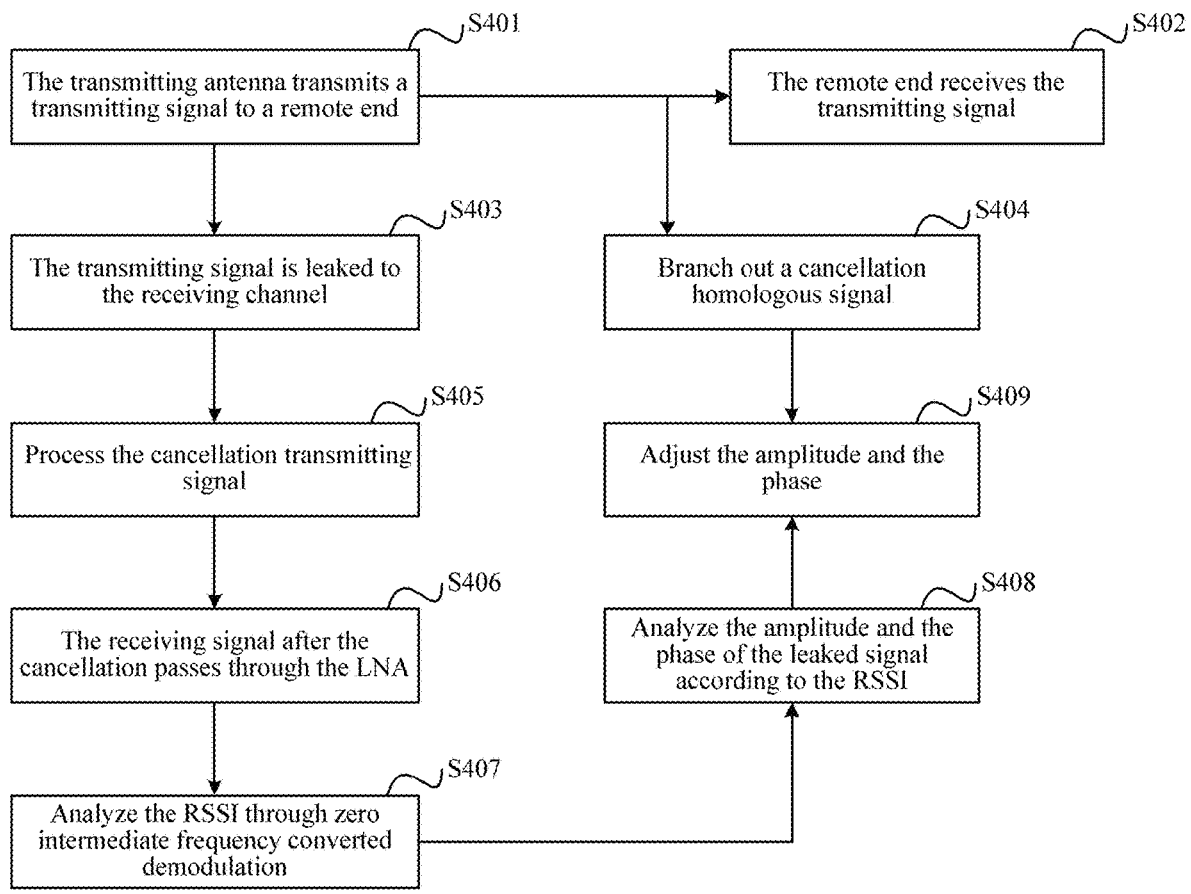
FIG. 4 is a flowchart of an amplitude phase adjustment on basis of an RSSI in an embodiment of the present disclosure.

FIG. 3 is a schematic diagram illustrating principles of the amplitude phase adjustment on the basis of the RSSI in an embodiment of the present disclosure. FIG. 4 is a flowchart of the amplitude phase adjustment on the basis of an RSSI in an embodiment of the present disclosure. The following uses a base station as an example. After antennas of the base station are erected, a distance between transceiving antennas (i.e., a receiving antenna and a transmitting antenna), an impedance matching of a transmitting circuit and a receiving circuit, and a phase relative position of transceiving channels (i.e., a receiving channel and a transmitting channel) are unlikely to change in a wide range. As shown in FIG. 3, a typical radio frequency phase cancellation CCFD technique may be used.

As shown in FIG. 3, S301, a cancellation homologous signal is branched from a transmitting radio frequency signal (i.e., the above-mentioned transmitting cancellation signal); S302, an amplitude phase adjustment is performed on the cancellation homologous signal; S303, the cancellation homologous signal is inverted after the amplitude and the phase of the cancellation homologous signal are adjusted; S304, a combination processing is performed on the inverted signal and a receiving signal received by the receiving antenna to cancel interferences of the transmitting signal leaked to the receiving channel; S305, an LNA processing is performed on the cancelled signal; S306, an RSSI is detected, and the transmitting signal leaked to the receiving channel is analyzed based on the RSSI, and control of the amplitude phase adjustment is provided, which is fed back to the amplitude phase adjustment of the cancellation homologous signal in S302.

The process of adjusting the amplitude and the phase of the transmitting cancellation signal based on the RSSI in the CCFD system provided in this embodiment is described below based on FIGS. 2 and 4. As shown in FIG. 4, the process of adjusting the amplitude and the phase of the transmitting cancellation signal based on the RSSI in the CCFD system of this embodiment may include steps described below.

In step S401, the transmitting antenna 108 transmits a transmitting signal to a remote end.

In step S402, the remote end receives the transmitting signal.

In step S403, the transmitting signal is leaked to the receiving channel 111 through the receiving antenna 107. Therefore, the receiving channel 111 receives the leaked transmitting signal besides the receiving signal transmitted from the remote end, and the transmitting signal is the noise in the receiving channel 111.

In step S404, a cancellation homologous signal (i.e., the transmitting cancellation signal) is branched from the transmitting channel 109 by the cancellation power division unit 110 (such as a coupler) and is transmitted to the amplitude phase unit 104 for the amplitude phase adjustment.

In step S405, the cancellation unit 112 (such as a combiner) processes the cancellation transmitting signal, that is, performs the combination processing on the receiving signal received by the receiving antenna 107 and the transmitting cancellation signal branched from the transmitting channel 109.

In step S406, the cancelled signal passes through the LNA 106.

In step S407, the RSSI detection amplitude phase adjustment unit 103 analyzes the RSSI through zero intermediate frequency converted demodulation.

In step S408, the amplitude and the phase of the transmitting signal leaked to the receiving channel are analyzed according to the RSSI, the control of the phase amplitude adjustment is provided to the amplitude phase unit 104.

In step S409, the amplitude phase unit 104 adjusts the amplitude and the phase of the branched cancellation homologous signal, and provides the adjusted cancellation homologous signal to the cancellation unit 112 for performing the cancellation processing, thereby achieving the closed-loop control.

In this manner, the base station system determines the phase cancellation feedback of the CCFD by using the RSSI, and reads an RSSI value through the changing of a phase shifter (that is, the amplitude phase unit 104) to confirm an adjustment range of the phase shifter. The RSSI is served as a final determination basis for the radio frequency cancellation method, which has advantages of simple and instant, and the deepest source data is used for ensuring the CCFD effect. While the disadvantage is that a saturation distortion for receiving the LNA will greatly affect the actual CCFD effect, and in an LNA saturation state, the adjustment range of the phase shifter may not restore the RSSI data back to a recognizable determination basis range. When the above issues exist on the base station side, which may be avoided in a manner such as adjusting the distance of the transmitting antenna and the receiving antenna, but in a terminal product (such as a mobile phone, etc.) due to limitations of a product size, even a same antenna is used for transmitting and receiving, a phase of the antenna changes greatly when it is held by a hand, and these scenarios happen more frequently, changing of a tuner of a terminal circuit also relatively greatly changes the phases of the transmitting antenna and the receiving antenna. Therefore, an RSSI data distortion caused by the saturation distortion for receiving the LNA by using the CCFD technology will cause phase shift control of the phase shifter to be runaway.

The reason why the RSSI is used as the determination basis for adjusting and transmitting the amplitude and the phase of the transmitting signal received by the cancellation receiving antenna is described below.

The receiving channel of the CCFD system not only receives a signal transmitted by the remote end, but also receives a signal transmitted by the receiving channel itself, and this transmitting signal is the noise for the receiving channel. If the noise is strong enough, the signal received from the remote end will be annihilated, a signal-to-noise ratio (SNR) of the receiving channel is deteriorated, and the RSSI is an indicator of this signal-to-noise ratio. It may be seen that the RSSI is not directly related to the transmitting power cancellation of the CCFD, and a magnitude of the transmitting power after the cancellation is a part of a noise denominator of the RSSI. It is assumed that a phase of a cancellation transmitting branch and the phase of the receiving channel are reversed (a phase difference is 180°), a power of the cancellation branch is same as an amplitude of the transmitting signal received by the receiving channel from the transmitting channel, then the transmitting signal leaked to the receiving channel by the transmitting channel through the antenna is totally cancelled.

The RSSI may be expressed as: RSSI=receiving signal/ (basis noise+transmitting leaked noise).

It may be seen that the RSSI is associated with the transmitting leaked noise. When the RSSI is deteriorated, the amplitude phase adjustment of the transmitting signal of the cancellation branch is initiated. If the RSSI is improved, it may be determined that the RSSI deterioration is caused by the transmitting leaked noise. Initiation of the amplitude phase adjustment reduces the transmitting leaked noise, thus reducing the denominator of the RSSI. The above adjustment method is suitable for a system which has a fixed relative position of antennas of the base station, and a relatively small phase changing of the transmitting channel relative to the receiving channel, and requires only a fine-tuning. In a scenario where the phase changes relatively large due to an impedance changing of the transmitting channel and the receiving channel cause by external loads, the RSSI served as the determination basis for adjusting the amplitude and the phase has the following issues.

Issue one: in a system with a very small spacing between a transmitting antenna and a receiving antenna (such as a terminal handheld system), the isolation of a transmitting signal and a receiving signal is much smaller than that of the base station. A characteristic of the CCFD is that the receiving and transmitting are co-frequency and co-time, and the transmitting signal is inevitably leaked to the receiving channel. If the isolation of the transmitting antenna and the receiving antenna is relatively small, then an amplitude of the transmitting signal leaked to the receiving channel is larger. If the transmitting leaked signal is not cancelled in time before receiving the LNA, the LNA will be saturated, and the LNA operates in a non-linear state. In this case, the RSSI must be deteriorated, and a direction of the amplitude phase adjustment cannot be determined, so as to delay a speed of the amplitude phase adjustment for cancelling the transmitting leakage. Since the determination basis for the amplitude phase adjustment is obtained after the LNA, an influence of the LNA distortion will be directly delivered to the RSSI, which causes interferences to the determination basis for adjusting the amplitude and the phase, reduces accuracy of the amplitude phase adjustment and leads to an oscillation and a loss of the determination of the amplitude phase adjustment.

Issue two: in a system where the phase change of the transmitting antenna and the receiving antenna is relatively large, if the RSSI is served as the determination basis for the amplitude phase adjustment, the RSSI of the system is deteriorated due to the phase change of the antennas, and even the noise may be higher than the receiving signal, Although the amplitude and the phase may be adjusted again to make the RSSI return to be normal, but if the noise is too strong, a phase shift cannot improve the RSSI. In this case, using the RSSI as the determination basis will make the system lose the direction of the determination.

It may be seen from the above two issues, a relatively small spacing between the transmitting antenna and the receiving antenna of the CCFD system and the variable inherent phase will cause the LNA distortion, which causes interferences to using the RSSI as the determination basis of the amplitude phase adjustment.

A manner of adjusting the amplitude and the phase of the transmitting cancellation signal based on the output power of the first combiner of the power detection amplitude phase adjustment unit is described below.

In this manner, the RSSI is not served as the determination basis for the amplitude phase adjustment, but before a detection point for determining the phase is moved in front of the LNA, and the phase shifter is adjusted in advance before a high-power blocking the LNA occurs, so as to achieve the transmitting receiving cancellation and ensure the normal operation of the LNA.

Figure 5:
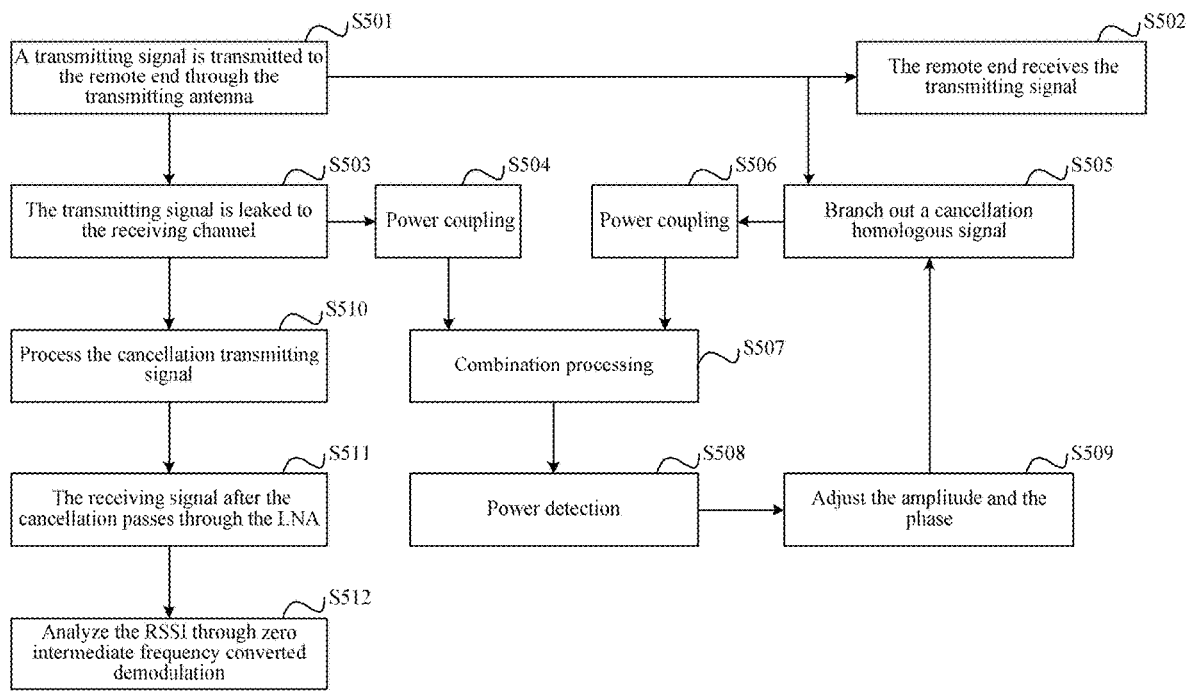
FIG. 5 is a flowchart of an amplitude phase adjustment on basis of an output power of a first combiner in an embodiment of the present disclosure.

The process of adjusting the amplitude and the phase of the transmitting cancellation signal based on the output power of the first combiner of the power detection amplitude phase adjustment unit is described below based on FIGS. 2 and 5. As shown in FIG. 5, the above process may include steps described below.

In step S501, the transmitting antenna 108 transmits a transmitting signal to the remote end.

In step S502, the remote end receives the transmitting signal.

In step S503, the transmitting signal is leaked to the receiving channel 111 through the receiving antenna 107. Therefore, the receiving channel 111 receives the leaked transmitting signal besides the receiving signal from the remote end, and the transmitting signal is the noise in the receiving channel 111.

In step S504, the first coupler 201 performs power coupling on the receiving signal, and transmits the transmitting signal leaked to the receiving channel 111 to the first combiner 203.

In step S505, a cancellation homologous signal (i.e., the transmitting cancellation signal) is branched from the transmitting channel 109 by the cancellation power division unit 110 and is transmitted to the second coupler 202 and the amplitude phase unit 104.

In step S506, the second coupler 202 performs the power coupling and transmits the transmitting cancellation signal branched from the transmitting channel 109 to the first combiner 203.

In step S507, the first combiner 203 performs a combination processing on the transmitting signal leaked to the receiving channel 111 and the branched transmitting cancellation signal.

In step S508, the power detection controller 204 detects the output power after the combination, serves the output power as the basis for adjusting the amplitude and the phase of the transmitting cancellation signal, and provides the amplitude phase unit 104 with the control of the amplitude phase adjustment.

In step S509, the amplitude phase unit 104 adjusts the amplitude and the phase of the branched transmitting cancellation signal, thereby implementing the closed-loop control before the LNA 106.

The steps S510 to S512 are similar to the steps S405 to S407 in FIG. 4, which will not be repeated here.

In this embodiment, the transmitting signal leaked to the receiving channel and the transmitting cancellation signal branched from the transmitting channel are respectively obtained through couplers (the first coupler 201 and the second coupler 202), and then the combination processing is performed on the branched transmitting cancellation signal and the transmitting signal leaked to the receiving channel through the first combiner, and the combined output power is served as the basis for the amplitude phase adjustment of the transmitting cancellation signal.

In this manner, the amplitude and the phase of the transmitting cancellation branch is firstly adjusted before the LNA is distorted, so that transmitting signals leaked to the receiving channel are cancelled before entering the LNA.

As shown in FIG. 5, a closed-loop control which completes the cancellation of the transmitting signal before the LNA is built, so that the determination basis for controlling the amplitude phase adjustment is before the LNA, thus the RSSI cannot be determined when the phase of the transmitting antenna and the receiving antenna transmitting a high-power has large fluctuations.

In addition, an embodiment of the present disclosure further provides a CCFD circuit, the CCFD circuit includes: a first coupler, a second coupler, and a first combiner. Where the first coupler and the second coupler are electrically connected to the first combiner respectively, the first coupler is electrically connected between the receiving antenna and the low noise amplifier, and the first coupler transmits a transmitting signal leaked to the receiving channel to the first combiner, the second coupler is electrically connected between the transmitting antenna and the transmitting channel, and the second coupler transmits the transmitting cancellation signal branched from the transmitting channel to the first combiner; an output power of the first combiner after the first combiner performs a combination processing on the transmitting signal and the transmitting cancellation signal is served as a basis for adjusting the amplitude and the phase of the transmitting cancellation signal.

The CCFD circuit of this embodiment may further include a power detection controller, the power detection controller is electrically connected to the first combiner and the amplitude phase unit; and the power detection controller controls, according to the output power of the first combiner, the amplitude phase unit to adjust the amplitude and the phase of the transmitting cancellation signal.

In addition, for the relevant descriptions of the CCFD circuit in the embodiment, references may be made to the relevant descriptions of the CCFD system, and thus no details are repeated herein.

In addition, an embodiment of the present disclosure further provides a terminal used for a full-time duplex, the terminal includes: a full-time duplex circuit, a receiving antenna, a receiving channel, an LNA, a transmitting antenna, and a transmitting channel; the receiving channel is electrically connected between the receiving antenna and the LNA.

The full-time duplex circuit includes a first coupler, a second coupler, and a first combiner; the first coupler and the second coupler are electrically connected to the first combiner respectively; the first coupler is electrically connected between the receiving antenna and the low noise amplifier, and the first coupler transmits a transmitting signal leaked to the receiving channel to the first combiner; the second coupler is electrically connected between the transmitting antenna and the transmitting channel, and the second coupler transmits the transmitting cancellation signal branched from the transmitting channel to the first combiner; an output power of the first combiner after the first combiner performs a combination processing on the transmitting signal and the transmitting cancellation signal is served as a basis for adjusting the amplitude and the phase of the transmitting cancellation signal.

In this embodiment, the terminal may further include: an amplitude phase unit; the full-time duplex circuit may further include a power detection controller, the power detection controller is electrically connected to the first combiner and the amplitude phase unit; and the power detection controller controls, according to the output power of the first combiner, the amplitude phase unit to adjust the amplitude and the phase of the transmitting cancellation signal.

In addition, for the relevant descriptions of the terminal used for the CCFD system in the embodiment, references may be made to the relevant descriptions of the above CCFD system, and thus no further details are repeated herein.

Figure 6:
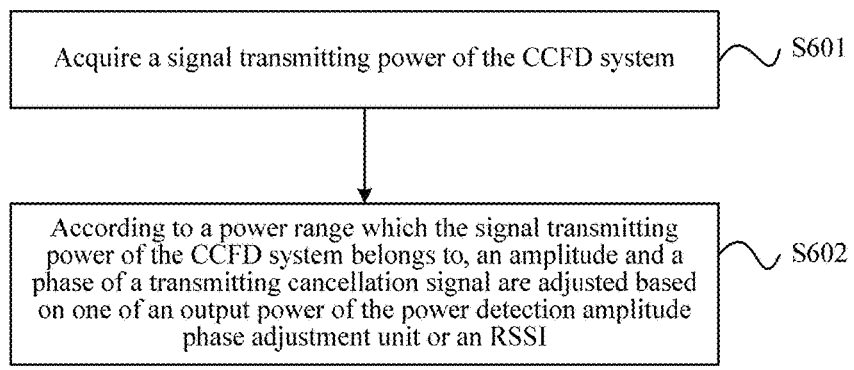
FIG. 6 is a flowchart of a control method for a CCFD system provided by an embodiment of the present disclosure.

FIG. 6 is a flowchart of a control method for a CCFD system provided by an embodiment of the present disclosure. The CCFD system includes: a receiving antenna, a transmitting antenna, a transmitting channel, an LNA, a power detection amplitude phase adjustment unit, the power detection amplitude phase adjustment unit is electrically connected between the receiving antenna and the LNA, and the power detection amplitude phase adjustment unit is electrically connected between the transmitting antenna and the transmitting channel.

As shown in FIG. 6, the control method provided by this embodiment includes steps described below.

In step S601, a signal transmitting power of the CCFD system is acquired.

In step S602, according to a power range which the signal transmitting power of the CCFD system belongs to, an amplitude and a phase of a transmitting cancellation signal are adjusted based on one of an output power of the power detection amplitude phase adjustment unit or a received signal strength indication.

In an exemplary embodiment, the step 602 may include a step described below.

When the signal transmitting power satisfies a first power range, the amplitude and the phase of the transmitting cancellation signal are adjusted based on the output power of the power detection amplitude phase adjustment unit; or when the signal transmitting power satisfies a second power range, the amplitude and the phase of the transmitting cancellation signal are adjusted based on the RSSI.

Where a minimum value of the first power range is greater than or equal to a maximum value of the second power range.

The CCFD system may further include a receiving channel, which is electrically connected between the receiving antenna and the LNA. The power detection amplitude phase adjustment unit may include: a first coupler, a second coupler, and a first combiner; the first coupler and the second coupler are electrically connected to the first combiner respectively; the first coupler is electrically connected between the receiving antenna and the receiving channel; and the second coupler is electrically connected between the transmitting antenna and the transmitting channel.

Before adjusting the amplitude and the phase of the transmitting cancellation signal based on the output power of the power detection amplitude phase adjustment unit, the method of this embodiment may further include steps described below.

The transmitting signal leaked to the receiving channel is transmitted to the first combiner through the first coupler;

the transmitting cancellation signal branched from the transmitting channel is transmitted to the first combiner through the second coupler;

a combination processing is performed on the transmitting signal and the transmitting cancellation signal through the first combiner; and an output power after performing the combination processing on the transmitting signal and the transmitting cancellation signal leaked to the receiving channel is acquired, and the output power is served as a basis for adjusting the amplitude and the phase of the transmitting cancellation signal.

Before adjusting the amplitude phase of the transmitting cancellation signal based on the RSSI, the method of this embodiment may further include steps described below.

A combination processing is performed on the transmitting cancellation signal branched from the transmitting channel and a receiving signal of the receiving channel;

the combined signal is processed through the LNA;

the RSSI is acquired according to the signal processed by the LNA.

Where, the minimum value of the first power range and the maximum value of the second power range may be determined according to an isolation of the transmitting antenna and the receiving antenna of the CCFD system and the 1 db compression point power for receiving and using the LNA.

For the relevant processing flow of the method in this embodiment, references may be made to the descriptions of the above-mentioned system embodiment, and thus no further details are repeated herein.

In addition, the embodiments further provide a communication device including: a receiving antenna, a transmitting antenna, a transmitting channel, an LNA, a power detection amplitude phase adjustment unit, a processor and a memory; the power detection amplitude phase adjustment unit is electrically connected between the receiving antenna and the LNA, and the power detection amplitude phase adjustment unit is electrically connected between the transmitting antenna and the transmitting channel; the memory is configured to store a control program for a CCFD system. When executed by the processor, the control program preforms the steps of the above control method.

The processor may include, but is not limited to, a microcontroller unit (MCU), a field programmable gate array (FPGA) or another processing apparatuses. The memory may be configured to store software programs and modules of application software, such as program instructions/modules corresponding to the control method in this embodiment. The processor executes the software programs and modules stored in the memory to perform functional applications and data processing, such as to implement the method provided by this embodiment. The memory may include a high-speed random access memory, and may further include a nonvolatile memory, such as one or more magnetic storage apparatuses, flash memories or other non-volatile solid-state memories. In some examples, the memory may include memories which are remotely disposed relative to the processor, and these remote memories may be connected to the communication device via a network. Examples of the preceding network include, but are not limited to, the Internet, an intranet, a local area network, a mobile communication network and combinations thereof.

In addition, an embodiment of the present disclosure further provides a computer-readable storage medium, which is configured to store a control program for a CCFD system. When executed by the processor, the control program executes the steps of the control method described above.

It should be understood by those skilled in the art that functional modules or units in all or part of the steps of the method, the system and the device disclosed above may be implemented as software, firmware, hardware and appropriate combinations thereof. In the hardware implementation, the division of the functional modules or units mentioned in the above description may not correspond to the division of physical components. For example, one physical component may have multiple functions, or one function or step may be executed jointly by several physical components. Some or all components may be implemented as software executed by processors such as digital signal processors or microcontrollers, hardware, or integrated circuits such as application integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage devices, or any other media used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium.

Although the embodiments disclosed by the present application are as described above, the content thereof is merely embodiments for facilitating the understanding of the present application and is not intended to limit the present application. Any person skilled in the art to which the present application pertains may make any modifications and variations in the implementation forms and details without departing from the spirit and scope disclosed by the present application, but the patent protection scope of the present application is still subject to the scope defined by the appended claims.

What is claimed is:

1. A full-time duplex system, comprising:
   a receiving antenna, a transmitting antenna, a transmitting channel, a low noise amplifier, a mode determination unit, a power detection amplitude phase adjustment unit, a received signal strength indication detection amplitude phase adjustment unit and an amplitude phase unit;
   wherein the power detection amplitude phase adjustment unit is electrically connected between the receiving antenna and the low noise amplifier, and the power detection amplitude phase adjustment unit is electrically connected between the transmitting antenna and the transmitting channel; the mode determination unit is electrically connected to the power detection amplitude phase adjustment unit and the received signal strength indication detection amplitude phase adjustment unit, and the power detection amplitude phase adjustment unit and the received signal strength indication detection amplitude phase adjustment unit are electrically connected to the amplitude phase unit respectively; and
   wherein the mode determination unit, according to a power range which a signal transmitting power of the full-time duplex system belongs to, notifies one of the power detection amplitude phase adjustment unit or the received signal strength indication detection amplitude phase adjustment unit of controlling the amplitude phase unit to adjust an amplitude and a phase of a transmitting cancellation signal.

2. The system of claim 1, wherein the mode determination unit, according to a power range which a signal transmitting power of the full-time duplex system belongs to, notifies one of the power detection amplitude phase adjustment unit or the received signal strength indication detection amplitude phase adjustment unit of controlling the amplitude phase unit to adjust the amplitude and the phase of the transmitting cancellation signal according to the power range which the signal transmitting power of the full-time duplex system belongs to comprises:
   in a case where the mode determination unit determines that the signal transmitting power of the full-time duplex system satisfies a first power range, notifying the power detection amplitude phase adjustment unit of controlling the amplitude phase unit to adjust the amplitude and the phase of the transmitting cancellation signal; or
   in a case where the mode determination unit determines that the signal transmitting power satisfies a second power range, notifying the received signal strength indication detection amplitude phase adjustment unit of controlling the amplitude phase unit to adjust the amplitude and the phase of the transmitting cancellation signal;
   wherein a minimum value of the first power range is greater than or equal to a maximum value of the second power range.

3. The system of claim 1, further comprising: a transmitting power detection unit;
   wherein the transmitting power detection unit is electrically connected between the transmitting channel and the transmitting antenna, and the transmitting power detection unit is electrically connected to the mode determination unit; and
   wherein the transmitting power detection unit detects the signal transmitting power of the full-time duplex system, and sends a detected signal transmitting power to the mode determination unit.

4. The system of claim 1, further comprising: a receiving channel;
   wherein the receiving channel is electrically connected between the receiving antenna and the low noise amplifier; and
   wherein the power detection amplitude phase adjustment unit comprises: a first coupler, a second coupler, and a first combiner; wherein the first coupler and the second coupler are electrically connected to the first combiner respectively; the first coupler is electrically connected between the receiving antenna and the receiving channel, and the first coupler transmits a transmitting signal leaked to the receiving channel to the first combiner; the second coupler is electrically connected between the transmitting antenna and the transmitting channel, and the second coupler transmits the transmitting cancellation signal branched from the transmitting channel to the first combiner; and an output power of the first combiner after the first combiner performs a combination processing on the transmitting signal and the transmitting cancellation signal is served as a basis for adjusting the amplitude and the phase of the transmitting cancellation signal.

5. The system of claim 4, wherein the power detection amplitude phase adjustment unit further comprises a power detection controller, and the power detection controller is electrically connected to the mode determination unit, the first combiner and the amplitude phase unit; and wherein after receiving a notification of the mode determination unit, and the power detection controller controls, according to the output power of the first combiner, the amplitude phase unit to adjust the amplitude and the phase of the transmitting cancellation signal.

6. The system of claim 2, wherein the minimum value of the first power range and the maximum value of the second power range are determined according to a maximum input power for receiving and using the low noise amplifier and an isolation of the receiving antenna and the transmitting antenna.

7. A full-time duplex circuit, comprising: a first coupler, a second coupler and a first combiner; wherein
the first coupler and the second coupler are electrically connected to the first combiner respectively, the first coupler is electrically connected between a receiving antenna and a low noise amplifier, the first coupler transmits a transmitting signal leaked to a receiving channel to the first combiner, the second coupler is electrically connected between a transmitting antenna and a transmitting channel, the second coupler transmits a transmitting cancellation signal branched from the transmitting channel to the first combiner, and an output power of the first combiner after the first combiner performs a combination processing on the transmitting signal and the transmitting cancellation signal is served as a basis for adjusting an amplitude and a phase of the transmitting cancellation signal;
wherein the full-time duplex circuit is electrically connected to a mode determination unit and an amplitude phase unit, respectively, the mode determination unit and the amplitude phase unit are electrically connected to a received signal strength indication detection amplitude phase adjustment unit, respectively, and the low noise amplifier is electrically connected to the received signal strength indication detection amplitude phase adjustment unit; and
wherein the mode determination unit is configured to notify, according to a power range to which a signal transmitting power belongs, one of the full-time duplex circuit or the received signal strength indication detection amplitude phase adjustment unit of controlling the amplitude phase unit to adjust an amplitude and a phase of the transmitting cancellation signal.

8. The circuit of claim 7, further comprising: a power detection controller, wherein the power detection controller is electrically connected to the first combiner and the amplitude phase unit, and the power detection controller controls, according to the output power of the first combiner, the amplitude phase unit to adjust the amplitude and the phase of the transmitting cancellation signal.

9. A terminal used for a full-time duplex system, comprising: a full-time duplex circuit, a receiving antenna, a receiving channel, a low noise amplifier, a transmitting antenna, a transmitting channel, a mode determination unit, an amplitude phase unit and a received signal strength indication detection amplitude phase adjustment unit; wherein the receiving channel is electrically connected between the receiving antenna and the low noise amplifier;
wherein the full-time duplex circuit is electrically connected to the mode determination unit and the amplitude phase unit, respectively, the mode determination unit and the amplitude phase unit are electrically connected to the received signal strength indication detection amplitude phase adjustment unit, respectively, and the low noise amplifier is electrically connected to the received signal strength indication detection amplitude phase adjustment unit;
wherein the full-time duplex circuit comprises: a first coupler, a second coupler, and a first combiner; the first coupler and the second coupler are electrically connected to the first combiner respectively; the first coupler is electrically connected between the receiving antenna and the low noise amplifier, and the first coupler transmits a transmitting signal leaked to the receiving channel to the first combiner; the second coupler is electrically connected between the transmitting antenna and the transmitting channel, and the second coupler transmits a transmitting cancellation signal branched from the transmitting channel to the first combiner; and an output power of the first combiner after the first combiner performs a combination processing on the transmitting signal and the transmitting cancellation signal is served as a basis for adjusting an amplitude and a phase of the transmitting cancellation signal; and
wherein the mode determination unit is configured to notify, according to a power range to which a signal transmitting power of the full-time duplex system belongs, one of the full-time duplex circuit or the received signal strength indication detection amplitude phase adjustment unit of controlling the amplitude phase unit to adjust an amplitude and a phase of the transmitting cancellation signal.

10. The terminal of claim 9,
wherein the full-time duplex circuit further comprises: a power detection controller, the power detection controller is electrically connected to the first combiner and the amplitude phase unit, and the power detection controller controls, according to the output power of the first combiner, the amplitude phase unit to adjust the amplitude and the phase of the transmitting cancellation signal.

11. A control method for a full-time duplex system, applied to the full-time duplex system according to claim 1, comprising:
acquiring a signal transmitting power of the full-time duplex system; and
adjusting, according to a power range which the signal transmitting power of the full-time duplex system belongs to, an amplitude and a phase of a transmitting cancellation signal based on one of an output power of the power detection amplitude phase adjustment unit or a received signal strength indication.

12. The method of claim 11, wherein adjusting, according to the power range of the signal transmitting power of the full-time duplex system belongs to, the amplitude and the phase of the transmitting cancellation signal based on one of the output power of the power detection amplitude phase adjustment unit or the received signal strength indication comprises:
in a case where the signal transmitting power satisfies a first power range, adjusting the amplitude and the phase of the transmitting cancellation signal based on the output power of the power detection amplitude phase adjustment unit; or in a case where the signal transmitting power satisfies a second power range, adjusting the amplitude and the phase of the transmitting cancellation signal based on the received signal strength indication;

wherein a minimum value of the first power range is greater than or equal to a maximum value of the second power range.

13. The method of claim 11, wherein before adjusting the amplitude and the phase of the transmitting cancellation signal based on the output power of the power detection amplitude phase adjustment unit, the method further comprises:

transmitting a transmitting signal leaked to a receiving channel comprised in the full-time duplex system to a first combiner comprised in the power detection amplitude phase adjustment unit through a first coupler comprised in the power detection amplitude phase adjustment unit;

transmitting the transmitting cancellation signal branched from the transmitting channel to the first combiner comprised in the power detection amplitude phase adjustment unit through a second coupler comprised in the power detection amplitude phase adjustment unit;

performing a combination processing on the transmitting signal and the transmitting cancellation signal through the first combiner comprised in the power detection amplitude phase adjustment unit; and acquiring an output power after performing the combination processing on the transmitting signal and the transmitting cancellation signal, and serving the output power as a basis for adjusting the amplitude and the phase of the transmitting cancellation signal.

14. The method of claim 11, wherein before adjusting the amplitude and the phase of the transmitting cancellation signal based on the received signal strength indication, the method further comprises:

performing a combination processing on the transmitting cancellation signal branched from the transmitting channel and a receiving signal of a receiving channel comprised in the full-time duplex system;

processing a combined signal through the low noise amplifier; and acquiring the received signal strength indication according to a signal processed by the low noise amplifier.

15. The method of claim 12, wherein the minimum value of the first power range and the maximum value of the second power range are determined according to a maximum input power for receiving and using the low noise amplifier and an isolation of the receiving antenna and the transmitting antenna.

16. A communication device, comprising: a receiving antenna, a transmitting antenna, a transmitting channel, a low noise amplifier, a power detection amplitude phase adjustment unit, a processor and a memory; wherein the power detection amplitude phase adjustment unit is electrically connected between the receiving antenna and the low noise amplifier, and the power detection amplitude phase adjustment unit is electrically connected between the transmitting antenna and the transmitting channel, the memory is configured to store a control program for a full-time duplex system, and the control program, when executed by the processor, perform the control method according to claim 11.

17. A non-transitory computer-readable storage medium, storing a control program for a full-time duplex system, wherein the control program, when executed by a processor, implements the control method according to claim 11.

18. A non-transitory computer-readable storage medium, storing a control program for a full-time duplex system, wherein the control program, when executed by a processor, implements the control method according to claim 12.

19. A non-transitory computer-readable storage medium, storing a control program for a full-time duplex system, wherein the control program, when executed by a processor, implements the control method according to claim 13.

20. A non-transitory computer-readable storage medium, storing a control program for a full-time duplex system, wherein the control program, when executed by a processor, implements the control method according to claim 14.

* * * * *